(12) United States Patent
Yamamoto et al.

(10) Patent No.: US 7,281,158 B2
(45) Date of Patent: Oct. 9, 2007

(54) METHOD AND APPARATUS FOR THE TAKEOVER OF PRIMARY VOLUME IN MULTIPLE VOLUME MIRRORING

(75) Inventors: Masayuki Yamamoto, Sunnyvale, CA (US); Akira Yamamoto, Cupertino, CA (US); Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 501 days.

(21) Appl. No.: 10/934,061

(22) Filed: Sep. 3, 2004

(65) Prior Publication Data

US 2005/0034013 A1 Feb. 10, 2005

Related U.S. Application Data

(63) Continuation of application No. 09/687,059, filed on Oct. 12, 2000, now Pat. No. 6,810,491.

(51) Int. Cl.
*G06F 11/00* (2006.01)
(52) U.S. Cl. .............................. 714/7; 714/6
(58) Field of Classification Search .................. 714/6, 714/7, 42
See application file for complete search history.

(56) References Cited

U.S. PATENT DOCUMENTS

| | | | |
|---|---|---|---|
| 5,412,661 A * | 5/1995 | Hao et al. .................. 714/6 |
| 5,574,851 A * | 11/1996 | Rathunde .................. 714/7 |
| 5,701,407 A * | 12/1997 | Matsumoto et al. ......... 714/7 |
| 5,872,906 A * | 2/1999 | Morita et al. .............. 714/6 |
| 6,052,759 A * | 4/2000 | Stallmo et al. ............ 711/114 |
| 6,052,797 A * | 4/2000 | Ofek et al. ............... 714/6 |
| 6,058,054 A * | 5/2000 | Islam et al. .............. 365/200 |
| 6,058,454 A * | 5/2000 | Gerlach et al. ........... 711/114 |
| 6,061,761 A * | 5/2000 | Bachmat .................. 711/114 |
| 6,079,029 A * | 6/2000 | Iwatani et al. ............ 714/6 |
| 6,098,119 A * | 8/2000 | Surugucchi et al. ........ 710/10 |
| 6,148,414 A * | 11/2000 | Brown et al. .............. 714/9 |
| 6,594,744 B1 * | 7/2003 | Humlicek et al. .......... 711/162 |

* cited by examiner

*Primary Examiner*—Scott Baderman
*Assistant Examiner*—Tim Bonura
(74) *Attorney, Agent, or Firm*—Townsend and Townsend and Crew LLP

(57) ABSTRACT

A multiple disk system comprises plural physical drives organized as plural groups of disks. Each group is accessed as a plurality of logical volumes. One of the logical drives is considered a primary volume and one or more other logical volumes are considered as secondary volumes, which together constitute a mirroring group. Data contained in a memory records such organization. The data is consulted to select a secondary volume when the disk group containing a primary volume fails.

9 Claims, 6 Drawing Sheets

Host I/F PORT Table 012400

| PORT No. (012410) | SCSI Target ID (012420) |
|---|---|
| 1 | 1 |
| 2 | 3 |
| ⋮ | |
| n | 5 |

FIG. 2

Data Integrity Disk Group (DIDG) Table 012500

| DIDG No. (012510) | Integrity Status (012520) |
|---|---|
| 1 | FAIL |
| 2 | COMPLETE |
| 3 | COMPLETE |

FIG. 3

LDEV Table 012600 (before takeover)

| LDEV No. (012610) | PORT No. (012620) | LUN (012630) | DIDG No. (012640) |
|---|---|---|---|
| 1 | 1 | 1 | 1 |
| 2 | 1 | 2 | 2 |
| 3 | 1 | 3 | 3 |
| 4 | 1 | 4 | 1 |
| 5 | 1 | 5 | 2 |
| 6 | 2 | 1 | 1 |
| 7 | 3 | 1 | 2 |
| 8 | 3 | 2 | 3 |

FIG. 4

LDEV Mirroring Group Table 012700 (before takeover)

| Mirroring Group No. (012710) | P/S VOL (012720) | LDEV No. (012730) | PVOL Swap (012740) | Status (012750) |
|---|---|---|---|---|
| 1 | PVOL | 1 | | |
| | SVOL | 2 | NEVER | PAIR |
| | SVOL | 3 | OK | SPLIT |
| | SVOL | 4 | OK | PAIR |
| | SVOL | 5 | OK | PAIR |

FIG. 5

LDEV Table 012600 (after takeover)
updated
FIG. 8
| LDEV No. (012610) | PORT No. (012620) | LUN (012630) | DIDG No. (012640) |
|---|---|---|---|
| 1 | 1 | 1 | 1 |
| 2 | 1 | 2 | 2 |
| 3 | 1 | 3 | 3 |
| 4 | 1 | 4 | 1 |
| 5 | 1 | 1 | 2 |
| 6 | 2 | 1 | 1 |
| 7 | 3 | 1 | 2 |
| 8 | 3 | 2 | 3 |
LDEV Mirroring Group Table 012700 (after takeover)
updated
FIG. 9
| Mirroring Group No. (012710) | P/S VOL (012720) | LDEV No. (012730) | PVOL Swap (012740) | Status (012750) |
|---|---|---|---|---|
| 1 | PVOL | 5 | | |
|  | SVOL | 2 | NEVER | PAIR |
|  | SVOL | 3 | OK | SPLIT |
LDEV Mirroring Group Table(2) 012700 (before takeover)
FIG. 10
| Mirroring Group No. (012710) | P/S VOL (012720) | LDEV No. (012730) |
|---|---|---|
| 1 | PVOL | 1 |
|  | SVOL | 2 |
|  | SVOL | 3 |
|  | SVOL | 4 |
|  | SVOL | 5 |

METHOD AND APPARATUS FOR THE TAKEOVER OF PRIMARY VOLUME IN MULTIPLE VOLUME MIRRORING

CROSS REFERENCE TO RELATED APPLICATIONS

This application is a continuation of U.S. application Ser. No. 09/687,059, filed Oct. 12, 2000 now U.S. Pat. No. 6,810,491, and is herein incorporated by reference for all purposes.

BACKGROUND OF THE INVENTION

The present invention relates generally to data storage systems and more particularly to recovery in a data storage system when a primary system goes offline.

It is very popular to use RAID (redundant array of inexpensive disks) techniques in disk storage systems in order to secure the reliability and availability of data. In general, when disk storage systems create a RAID volume, they use several physical disk drives and store the divided data according to one of a number of RAID-defined techniques. There are six basic RAID levels:

RAID level 0 employs a data "striping" technique in which data is partitioned into a number of stripes which are stored across two or more disks. This RAID level does not provide for disk failure conditions.

RAID level 1 uses a data "mirroring" technique in which data is written to a primary disk and is also mirrored onto another disk. This technique realizes fifty percent efficiency in storage since only one-half of the total storage capacity is available.

RAID level 2 stripes data in bits or bytes and reads or writes the data to the disks in parallel. The data is used to create a hamming code which is stored in a separate disk drive, is used to provide error-correction.

RAID level 3 partitions a data block into stripes which are then striped across multiple disk drives. A separate parity drive is used to store the parity bytes associated with the data block. The parity drives can be used to reproduce data from a failed drive.

RAID level 4 writes an entire data block to a drive, and the corresponding parity data for the block is written on another drive.

RAID level 5 partitions a data block into stripes which are then striped across multiple disk drives. The corresponding parity information is also striped across the disk drives.

Some disk storage systems have an additional function which is to create multiple copy volumes (secondary volumes) for one primary RAID volume autonomously. This function is called "multiple volume mirroring." Multiple volume mirroring has several characteristics including:

- system administrators create "volume mirroring groups" which are comprised of one primary volume and one or more secondary volumes;
- when a host system writes data to a primary volume, the disk control unit automatically writes the same data to the corresponding secondary volumes;
- when a system administrator wants to use the data from a primary volume, she can use the data from an associated secondary volume instead of the primary volume. To accomplish this, the system administrator performs a "split" operation of the selected secondary volume from the volume mirroring groups.

An advantage of multiple volume mirroring in computer systems is that it maintains the performance of host I/O accesses. For example, suppose that the host system(s) perform online transactions by accessing data from a primary volume. Suppose also that concurrent data backup operations of the primary volume are being performed. If the same primary volume is accessed for both handling online requests and performing backups, the host(s) would not be able to maintain the I/O throughput with the primary volume necessary to adequately handle online transactions in a real-time manner.

However, the performance of the primary volume can be maintained in a multiple volume mirroring arrangement by splitting one of the secondary volumes from the mirroring group and using it for the backup function. Host transactions continue concurrently without taking a performance hit.

Current disk systems which support a multiple volume mirroring function have a problem. When a primary volume fails or is taken offline for some reason, online transactions must cease, even though there may be several secondary volumes in that disk system. In order to re-assign one of the secondary volumes to take over the role of the primary volume, the system administrator must effectuate a split of the selected secondary volume. This requires that the system administrator take down the disk system in order to bring the secondary volume online. This can result in unacceptable delays in online transaction processing, for example, in a real-time financial processing system. There is a need for an improved disk system.

SUMMARY OF THE INVENTION

A disk system and access method in accordance with the invention includes a plurality of physical disk drives organized into plural disk groups. Each disk group is further organized into plural logical volumes. A data processing unit provides data mirroring among a mirroring group comprising one of the logical volumes, deemed as the primary volume, and one or more of the remaining logical volumes, deemed as secondary volumes. A data store contains information about the organization of the physical disk drives into disk groups and logical volumes. The data processing unit operating under the control of programming code performs input/output operations to provide data transfer between the disk system and one or more host systems. In response to a failure of a disk group containing a primary, an available secondary volume is selected as a failover volume. The selection is based on the data contained in the data store. The selection method includes a consideration of whether a candidate secondary volume resides on the same disk group. Another consideration is whether a candidate secondary volume is split from the mirroring group.

BRIEF DESCRIPTION OF THE DRAWINGS

FIGS. 2-5 are illustrative embodiments of the data tables used in accordance with the claimed invention;

FIGS. 8 and 9 show the tables of FIGS. 4 and 5 after system re-configuration in accordance with the steps shown in FIG. 6;

FIG. 10 is a simplified data table of FIG. 5, illustrating an alternate embodiment of the present invention.

DESCRIPTION OF THE SPECIFIC EMBODIMENTS

Figure 1:
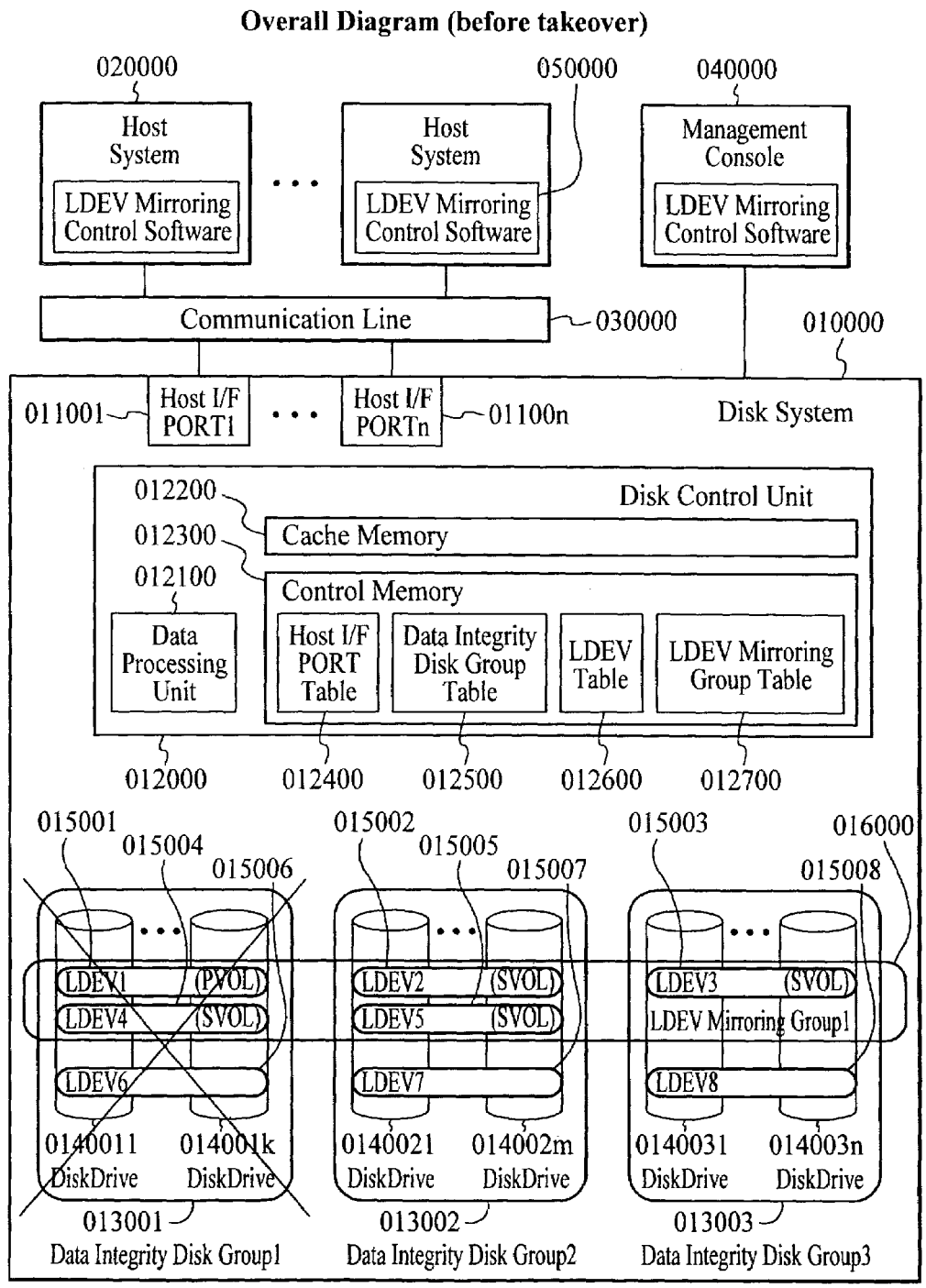
FIG. 1 shows in illustrative embodiment of a disk system in accordance with the invention.

FIG. 1 shows the overall diagram in an illustrative embodiment of the present invention. In accordance with this embodiment of the invention, an online transaction processing system includes one or more host systems 020000. The host systems read and write data to a disk system 010000. A communication line 030000 provides the data channel for data exchange between the host systems and the disk system. For example, the communication line may be a SCSI (small computer system interface) connection or a Fibre Channel link. Alternatively, the communication line can be a network communication channel such as in a local area network where disk system 010000 acts as a disk server. For illustrative purposes only, the embodiment shown in FIG. 1 uses a disk system interface that implements a SCSI interface.

A management console 040000 is connected to a maintenance port on the disk system. The management console allows a system administrator to perform administrative and maintenance tasks on the disk system. This may include taking portions of the disk system offline.

The disk system 010000 includes one or more host interface ports 011001 ... 01100n, one for each host system that connects to the disk system. This is the physical connection of the disk system to the host systems. A task of the system administrators is to assign a port to each host system.

A disk control unit 012000 includes a data processing unit 012100 to manage the data transfer between the host system(s) and the one or more disk drives comprising the disk system. The disk control unit includes a cache memory 012200 which is provided for buffering data to be written to and read from the disk system to improve performance. There is a control memory 012300 for storing and the various tables used by the disk control unit unit. There is program code which is executed by the data processing unit to perform its functions. Typically, the program code resides in the same memory as control memory 012300, but this is not necessary.

The storage devices are organized into three data integrity disk groups 013001, 013002, and 013003. Each data integrity disk group comprises several physical disk drives 0140011 ... 014001k, 0140021 ... 014002m, and 0140031 ... 014003n. Each data integrity disk group contains at least one, and typically more than one, physical disk drive. In the embodiment of the invention shown in FIG. 1, data integrity disk group 1 comprises k physical drives, data integrity disk group 2 comprises m physical drives, data integrity disk group 3 comprises n physical drives.

Software running on the data processing unit 012100 creates logical volumes (logical device). A logical volume is comprised of portions of the physical disk drives in a data integrity disk group. The software gathers and scatters the divided data in the logical volumes in response to input/output requests from the host systems. As an illustrative example, FIG. 1 shows a logical device LDEV 1 is defined in data integrity disk group 1. Also defined in data integrity disk group 1 are logical devices LDEV 4 and LDEV 6. Similarly, data integrity disk group 2 is organized into logical volumes LDEV 2, LDEV 5 and LDEV 7. Data integrity disk group 3 is likewise arranged into logical volumes LDEV 3 and LDEV 8. The data processing unit can also detect a failure in any of the disk system components, and can report to this information to the system admin via the management console.

Under the control of the disk control unit 012000, the logical volumes in each data integrity disk group are accessed in accordance with RAID conventions. Merely as an example, if a data integrity disk group is comprised of four physical disk drives, a RAID 3 volume can be established for this group, where the disk control unit uses three of the four disk drives for data striping and fourth disk drive for parity. A RAID 5 volume is implemented by striping the data across the four disk drives and distributing the parity information across the four disk drives as well.

In the most general case, each disk integrity group can be configured in accordance with a different RAID level. Thus, data integrity disk group 1 might be configured for level 1 RAID, while data integrity disk group 2 is accessed in accordance with level 3 RAID. The choice of which RAID level (or levels) are used is a system cost and administration concern, and is not relevant to the present invention. In fact, data redundancy is not a relevant aspect of the invention (though highly relevant from a marketing point of view), and each data integrity disk group can use no redundancy at all; e.g. level 0 RAID.

This group exhibits a range of data integrity in the disk system. If a disk in a given data integrity disk group breaks down, the logical volumes in that data integrity group become unavailable. However, the logical volumes in another data integrity group remain in working order. Though this embodiment of the invention shows three data integrity groups, it is understood that more or fewer data integrity groups can be provided.

When we use a multiple mirroring function in a disk system, system administrators need to establish the following information. An LDEV mirroring group which identifies those logical volumes which participate in data mirroring. A mirroring group includes one primary LDEV and one or more secondary LDEVs. Data written to the primary volume is mirrored in the secondary volumes.

In accordance with the invention, a secondary logical volume in an LDEV mirroring group can be "split" from the group. This is a temporary configuration which is used to increase data access speed. When a volume is split from the group, data mirroring to that split volume does not occur. Instead, the split volume is used for read access by host systems. A subsequent "rebind" operation brings the split volume back into the group. The rebound volume is updated with data changes to the primary volume during the time of the split.

Typically, this information is administered and managed by the system administrator. This software is shown in FIG. 1 as LDEV mirroring control software 050000. The software can reside in a central management system 040000. Alternatively, the software resides in one or more of the host systems.

Turn now to FIGS. 2-5 which show the tables in control memory 012300 of disk control unit 012000. In accordance with an illustrative embodiment of the present invention, at least the following tables are needed:

(1) Host I/F PORT Table (012400)

This table shows the relationship between host I/F ports and the I/O data transfer protocol in a communication line. As example, the shown embodiment uses the SCSI (small computer system interface) protocol as an I/O data transfer protocol. For SCSI, the following attributes in each record of this table include:

PORT No. (012410), which is a unique identifier of a Host I/F PORT in a disk system; and SCSI Target ID (012420), is which each host system assigns a unique device address to an attached SCSI device. This device address has a relationship to a pair of attributes (SCSI Target ID, Logical Unit Number (LUN)). When a host issues an I/O request to the disk system with an instance of this information pair (SCSI Target ID, LUN), the disk control unit looks into this table to find the selected PORT No based on the SCSI Target ID information.

(2) Data Integrity Disk Group (DIDG) Table (012500)

This table shows the data integrity status of each DIDG in the disk system. Each record of this table comprises the following information:

DIDG No. (012510) which is a unique identifier of DIDG in a disk system;

Integrity Status (012520) is an attribute which shows the integrity status in this DIDG. "Integrity status" refers to the integrity of the data contained in this DIDG. This attribute has two values: COMPLETE—the stored data in the DIDG is valid; and FAIL—the stored data in this DIDG is invalid due to a failure, for example, in one or more of the disk drives comprising the DIDG. If the disk control unit detects a failure of a DIDG, it updates its corresponding integrity status.

A DIDG can be manually "downed" by a system administrator for maintenance reasons. If the downed DIDG includes a primary volume, then data access would be interrupted due to the unavailability of the DIDG. In such a case, the system administrator can manually reconfigure the LDEV mirroring group with another primary volume. Consequently, it is not necessary for the disk control unit to update the DIDG Table entry for the downed DIDG.

In an embodiment where a DIDG uses some sort of redundancy such as RAID, the disk system is able to recover even if a physical disk drive in one of the DIDG's becomes disabled. The redundancy arrangement allows continued use of the DIDG. For example, if a DIDG uses level 5 RAID, then a failure of one of the constituent physical drives is compensated by virtue of the fact that the data can be recovered from the remaining active drives.

(3) LDEV Table (012600)

This table shows the information for each of the LDEV's in the disk system. Each table entry includes:

LDEV No. (012610) which is a unique identifier of an LDEV in the disk system;

PORT No. (012620)—When the administrator creates LDEVs in the disk system, the disk control unit assigns a certain Host I/F PORT to each LDEV. This attribute shows the relationship between an LDEV and its corresponding Host I/F PORT.

LUN (012630)—This attribute shows the relationship between an LDEV and its LUN. So when a host issues I/O request to a disk system with information of (SCSI Target ID, LUN) pair, the disk control unit looks up this table to find the selected LDEV.

DIDG No. (012640)—This attribute shows the DIDG in which the LDEV is located.

(4) LDEV Mirroring Group Table (012700)

This table shows the information of all LDEV Mirroring Groups in the disk system. When a system administrator creates an LDEV mirroring group via the LDEV mirroring control software, the data processing unit in the disk system creates a record of that LDEV mirroring group and manages it. Each entry in the table includes:

Mirroring Group No. (0127100) which is a unique identifier of an LDEV mirroring group in a disk system;

P/S VOL (0127200)—An LDEV mirroring group has one primary LDEV (PVOL) used by host systems and one or more secondary LDEVs (SVOLs). The P/S VOL attribute indicates whether an LDEV in this mirroring group is a PVOL or an SVOL.

LDEV No. (0127300) is the LDEV No. in this LDEV mirroring group;

PVOL Swap (0127400)—This attribute shows the availability of each SVOL as a candidate as a failover (or backup) volume when a PVOL fails. This attribute has two values: OK—this SVOL can be selected as a backup primary volume; and NEVER—this SVOL cannot be used as a failover volume if the PVOL fails. When system administrators create an LDEV mirroring group, they set up this attribute for every SVOL in an LDEV mirroring group via an LDEV mirroring control software. They can also change the value of this attribute at any time via the LDEV mirroring control software.

Mirroring Status (0127500) which shows the mirroring status (split or not split) of each SVOL in an LDEV mirroring group. This attribute has two kinds of values: PAIR—this SVOL is bound in an LDEV mirroring group; and SPLIT—this SVOL is split from its LDEV mirroring group.

Figure 6:
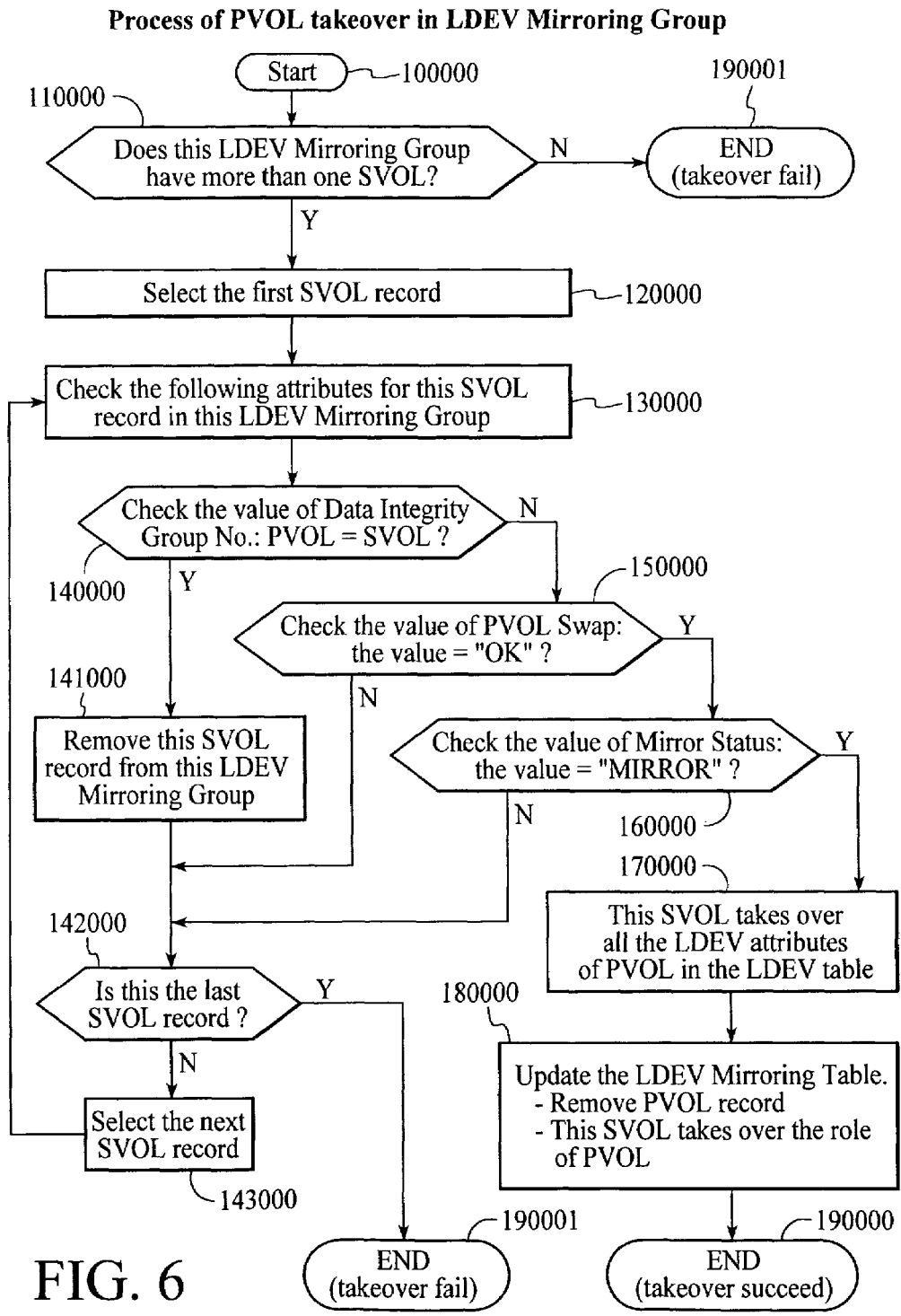
FIG. 6 is a flowchart showing the processing which takes place during a failed primary volume.

Refer now to FIG. 6 which shows the process of the takeover of a failed primary logical volume in an LDEV mirroring group in accordance with an illustrative embodiment of the present invention. In this embodiment, we begin with a configuration as shown by FIG. 1. The current state of the tables in the disk system at the time of failure are shown by FIGS. 2-5. Suppose that DIDG 1 in this disk system has failed, so that a failover volume must be selected. Consequently, an I/O operation to the primary volume in DIDG 1, namely LDEV 1, results in a failed operation. The disk control unit determines from LDEV table 012600 that the failed PVOL (primary volume) belongs to DIDG 1. The disk control unit in the disk system proceeds with the PVOL takeover process of DIDG 1 as follows, (Step 100000), to find a failover primary volume:

The disk control unit inspects the LDEV mirroring table 012700 to determine if LDEV Mirroring Group 1 has at lease one SVOL (secondary volume), (Step 110000). If there are no SVOLs in LDEV Mirroring Group 1, then the takeover process fails, (Step 190001). Otherwise, the disk control unit moves on to the next step in order to find the candidate from the current SVOLs to serve as a backup primary volume. In this case, LDEV Mirroring Group 1 comprises four secondary logical volumes.

The disk control unit chooses a first SVOL record in the LDEV mirroring group 1 (Step 120000), and checks certain attributes for this SVOL record in the LDEV mirroring group table (Step 130000). First, the disk control unit gets the LDEV No. of this SVOL and looks up the DIDG No. of this SVOL by using the LDEV table (Step 140000). If the DIDG No. of this SVOL is equal to the DIDG No. of the current PVOL, then the disk control unit removes this SVOL as a potential candidate. This is because the stored data of this SVOL is also broken down. So the disk control unit removes this SVOL record from this LDEV mirroring group (Step 141000). If the DIDG No. of this SVOL is different, processing continues.

The disk control unit then checks whether this SVOL can take over the PVOL or not (Step 150000). If the value of PVOL Swap is equal to "OK", then the disk control unit moves on to the last check. If not, it gives up the selection of this SVOL as a candidate for the failover primary volume.

The disk control unit checks the current Mirror Status of this SVOL (Step 160000). If the current status of this SVOL is "PAIR", the disk control unit selects this SVOL as a final candidate of a new PVOL. If current status is "SPLIT", then the disk control unit gives up the selection of this SVOL as a candidate for the replacement volume. When a secondary volume is split, it may not contain current data and it may be in use with other host systems.

The disk control unit continues with the above steps (Step 140000, 150000, and 160000) for each current SVOL until it can find a final candidate of a new PVOL (Step 142000 and 143000). If the disk control unit does not find a candidate in spite of looking up all the SVOLs, the takeover process fails (Step 190001). The order in which the LDEV mirroring group table 012700 is searched is not important to the invention. For illustrative purposes the discussion indicates a linear search. However, the search order for candidate SVOL's can be determined by the system administrator, or can be based on criteria that are appropriate to the particular operating conditions of the disk system.

If the disk control unit finds a final candidate SVOL to take over as the new PVOL, in Step 160000, processing moves on to the PVOL takeover steps. The takeover step consists of two steps:

(1) The disk control unit updates the LDEV table (Step 170000). The disk control unit makes a copy of all the attributes from a current PVOL record to a new PVOL record.

(2) The disk control unit updates the LDEV mirroring group table (Step 180000). The disk control unit removes the current PVOL record, and makes a new PVOL record. This completes the takeover process (Step 190000) in accordance with the invention.

Based on the information shown in FIGS. 2-5, it can be seen that the secondary volume identified as LDEV 2 is not a candidate for takeover purposes because this logical volume has been marked as never being allowed to be used as a primary volume.

Assuming a linear search pattern, the next secondary volume in the list for consideration is the secondary volume identified as LDEV 3. This logical volume is removed as a potential candidate because it is in a SPLIT condition and is thus unavailable as a failover primary volume.

Next in the list is secondary volume LDEV 4. This logical volume cannot be a candidate for taking over as a primary volume because the logical volume resides in DIDG 1, which by assumption is the failed disk group.

The next logical volume is LDEV 5. This becomes the selected logical volume to takeover as the new primary volume since none of the negative conditions apply to this volume.

Figure 7:
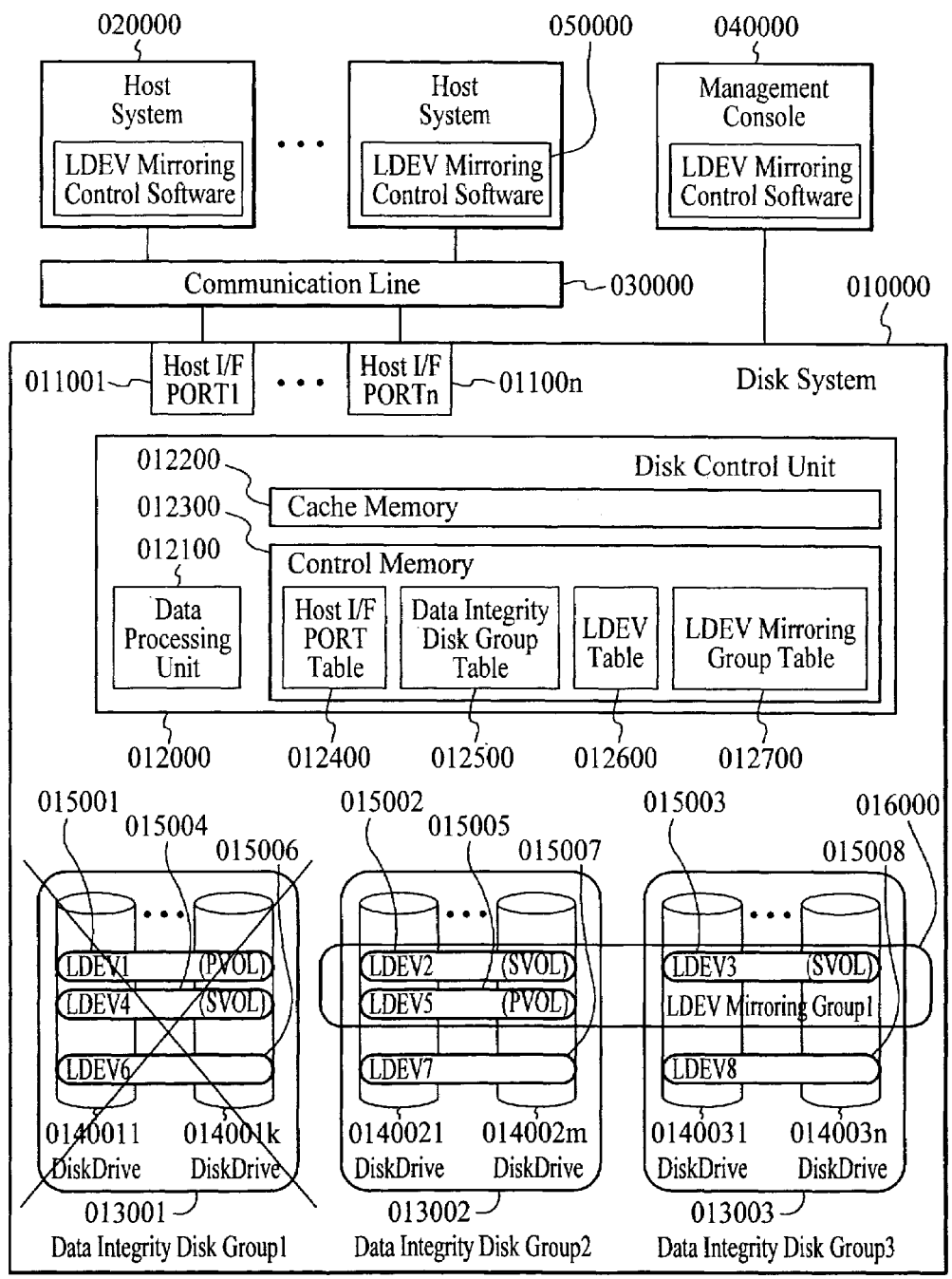
FIG. 7 illustrates the disk system in a re-configured state after processing in accordance with the steps shown in FIG. 6.

FIG. 7 shows an overall diagram after takeover. FIGS. 8 and 9 also show the LDEV table (012600) and LDEV mirroring group table (012700) updated as a result of the process of takeover.

Figure 11:
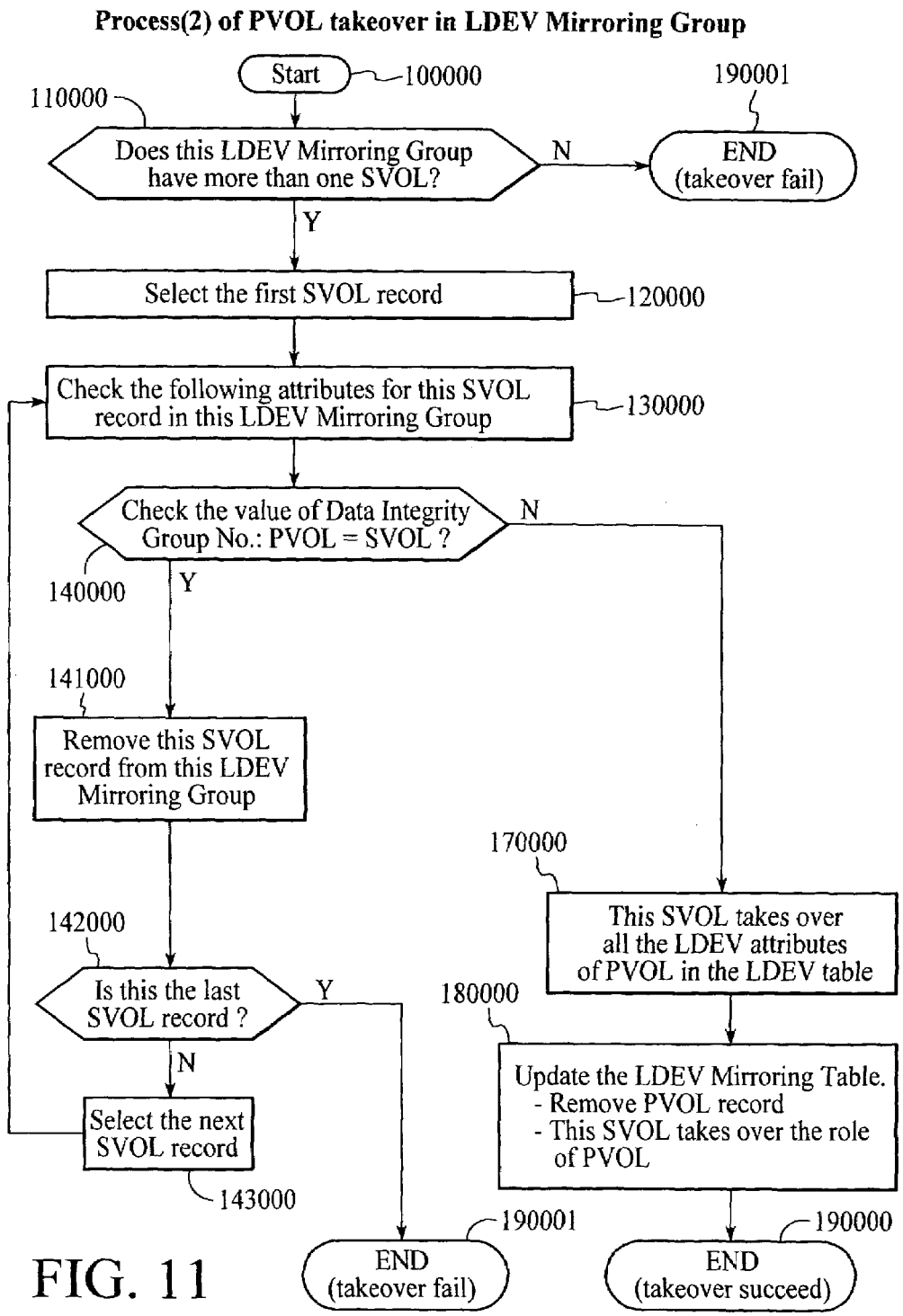
FIG. 11 depicts the processing which takes place using the simplified data table of FIG. 10.

Referring to FIGS. 10 and 11, an illustrative alternate embodiment of the invention is shown, wherein the LDEV mirroring group table (012700) comprises fewer attributes. FIG. 11 shows the takeover processing in accordance with the reduced table of FIG. 10. The different points between FIG. 5 and FIG. 10 are that FIG. 10 has no optional attributes like "PVOL Swap" and "Mirroring Status". In this case, the disk system only checks Step 140000 to find a final candidate of a new PVOL.

What is claimed is:

1. A method for data access comprising:
   grouping a plurality of disk drives into at least two disk groups, at least one disk group comprising disk drives configured as a redundant array, wherein one of said disk groups is not configured as a redundant array;
   organizing each disk group into one or more logical volumes, each said one or more logical volumes comprising two or more disk drives of one of said disk groups, a first logical volume among said disk groups being a primary volume, others of said one or more logical volumes being one or more secondary volumes, wherein data written to said primary volume is also written to said secondary volumes such that data in said primary volume is mirrored in said secondary volumes; and
   if said primary volume becomes unavailable, then designating one of said secondary volumes as a failover primary volume, including identifying said disk group to which said primary volume belongs and eliminating secondary volumes located on said disk group as candidates for said failover primary volume, wherein data is subsequently written to said failover primary volume.

2. The method of claim 1 wherein said primary volume belongs to a disk group that is configured as a redundant array and said failover primary volume belongs to a disk group that is not configured as a redundant array.

3. The method of claim 1 wherein said primary volume belongs to a disk group that is not configured as a redundant array and said failover primary volume belongs to a disk group that is configured as a redundant array.

4. The method of claim 1 wherein said disk groups are organized in accordance with one of level 1, 2, 3, 4, or 5 RAID techniques.

5. The method of claim 1 wherein said organizing includes creating first information that identifies to which disk group each of said logical volumes belongs, wherein said designating is based on said first information.

6. The method of claim 1 further including splitting one or more of said secondary volumes to produce one or more split volumes, said designating further including eliminating said split volumes as candidates for said failover primary volume.

7. The method of claim 1 wherein said primary volume is unavailable if at least one of its disk drives is unavailable.

8. The method of claim 1 further including receiving a maintenance request to make a first disk group unavailable, wherein said primary volume is unavailable if at least one of its disk drives belongs to said first disk group.

9. A method for data access comprising:
   grouping a plurality of disk drives into at least two disk groups, at least one disk group comprising disk drives configured as a redundant array;
   organizing each disk group into one or more logical volumes, each said one or more logical volumes comprising two or more disk drives of one of said disk groups, a first logical volume among said disk groups being a primary volume, others of said one or more logical volumes being one or more secondary volumes, wherein data written to said primary volume is also written to said secondary volumes such that data in said primary volume is mirrored in said secondary volumes; and
   in the event that said primary volume becomes unavailable because at least one of the disk drives in the primary volume is unavailable, designating one of said secondary volumes as a failover primary volume, including identifying said disk group to which said primary volume belongs and eliminating secondary volumes located on said disk group as candidates for said failover primary volume, wherein data is subsequently written to said failover primary volume.

* * * * *